United States Patent [19]
Flichy

[11] 3,865,499
[45] Feb. 11, 1975

[54] MEANS FOR SECURING A CIRCULAR PART IN THE FORM OF A DISC IN THE INTERIOR OF A CYLINDRICAL PART

[75] Inventor: Jacques E. Flichy, Versailles, France

[73] Assignee: Ateliers Metallurgiques de Saint-Urban, Paris, France

[22] Filed: Mar. 5, 1973

[21] Appl. No.: 338,411

[30] Foreign Application Priority Data
Apr. 5, 1972 France .............................. 72.11948

[52] U.S. Cl. ................. 403/326, 403/359, 403/377
[51] Int. Cl. ............................................... F16d 1/06
[58] Field of Search .................... 287/DIG. 7; 85/8.8; 403/315, 377, 326, 321, 359; 285/321

[56] References Cited
UNITED STATES PATENTS

| | | | |
|---|---|---|---|
| 1,630,367 | 5/1927 | Woodbridge | 85/8.8 UX |
| 3,297,344 | 1/1967 | Hanes | 285/321 X |
| 3,531,144 | 9/1970 | Bizilia | 403/326 |
| 3,650,182 | 3/1972 | Phillips | 285/321 X |

FOREIGN PATENTS OR APPLICATIONS

| | | | |
|---|---|---|---|
| 282,171 | 7/1952 | Switzerland | 85/8.8 |
| 392,629 | 3/1924 | Germany | 85/8.8 |

OTHER PUBLICATIONS
German printed application 1,239,532, Hansa Metallwerke, Apr. 27, 1967.

Primary Examiner—Andrew V. Kundrat
Attorney, Agent, or Firm—Woodhams, Blanchard and Flynn

[57] ABSTRACT

A securing structure for connecting a circular disclike part in the interior of a tubular part. The securing structure, which is designed to resist an axial force applied to the disc in a selected direction, includes a springlike keeper ring positioned within an annular groove formed in the periphery of the circular part and resiliently expandable to engage an annular channel formed in the interior wall of the tubular part. The annular groove has a first surface on the rearward side thereof relative to said selected direction, which first surface inclines inwardly toward the axis in said selected direction. The annular channel has a second surface on the front side thereof relative to said selected direction, which second surface is also inclined inwardly toward the axis in said selected direction. The first and second inclined surfaces converge with respect to one another as they project towards the axis, whereby the keeper ring engages the first and second surfaces and is positively maintained in engagement with the annular channel for locking the parts together when an axial force is imposed on the disc in said selected direction.

4 Claims, 3 Drawing Figures

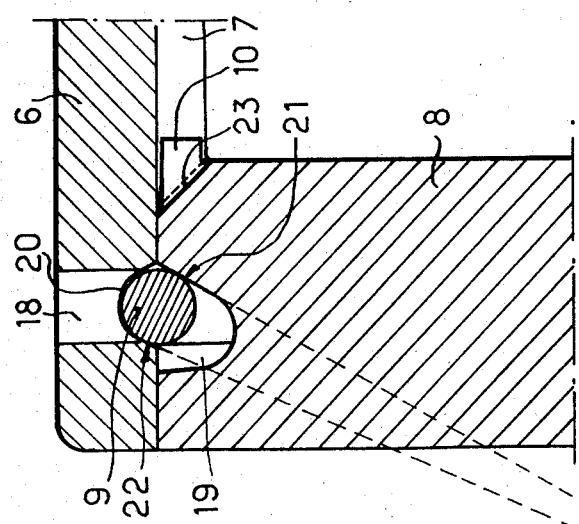
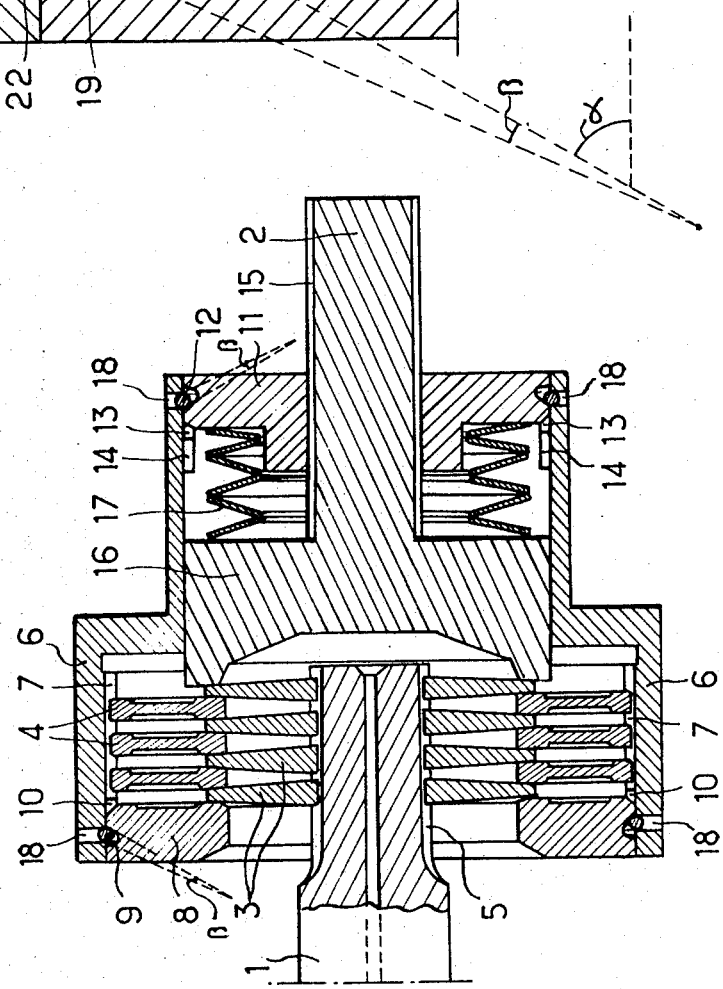
FIG. 2
FIG. 1

MEANS FOR SECURING A CIRCULAR PART IN THE FORM OF A DISC IN THE INTERIOR OF A CYLINDRICAL PART

The present invention concerns a means for securing, in the interior of a cylindrical part, a circular part in the form of a disc and subjected to an axial force, which means is of the type comprising a keeper ring adapted to move fully into an annular channel formed in the periphery of the discshaped part and designed to engage resiliently in an annular channel formed in the inner wall of the cylindrical part, when the two parts are fitted together.

In the known means of this type, the keeper ring is resiliently engaged in a groove of semi-circular cross-section formed in the cylindrical part. Unfortunately in an arrangement of this kind there is uncertainty as to the direction in which the forces acting on the keeper ring are applied, and the direction furthermore varies as the parts become worn. Consequently the resultant of these forces may be directed inwardly and may push the keeper ring away so that the part required to be secured is released.

The main object of the present invention is to eliminate this disadvantage and for this purpose there is provided a securing means of the aforementioned type which is mainly characterized in that the channel in the disc has on that of its side to which the axial force is applied a first inclined surface disposed in the same direction, whereas the channel in the cylindrical part has on the opposite side a second inclined surface likewise disposed in the same direction as that of the axial force, these two inclined surfaces converging towards said axis.

It will be thus readily appreciated that the directions of the forces acting on the keeper ring are clearly known. Furthermore, since the two inclined surfaces converge towards the axis, the resultant of these forces is always directed outwardly, and consequently tends to hold the keeper ring pressed into the channel in the cylindrical part, thus preventing any possible displacement of the disc.

The acute angle formed between the first inclined surface and the direction of the axial force is preferably between 45° and 80°.

It will be clear that the angle formed between the two inclined surfaces must be relatively small so that the radial force applied to the cylindrical part is not too great.

In the particular case where the cylindrical part has to be mounted on the circular part in the form of a disc to rotate therewith, co-operating grooves are advantageously formed in the interior wall of the cylindrical part and in the periphery of the disc-shaped part respectively, the depth of these grooves being less than the radial distance separating the lines of contact between the keeper ring and the inclined surfaces of the two channels.

An example of the arrangement in accordance with the invention will now be described by reference to the annexed drawing in which:

FIG. 1 is a simplified longitudinal section along the axis of a speed-change unit fitted with securing means in accordance with the invention;

FIG. 2 is a detail view, in section and on a larger scale, of one of these securing means.

Figure 3:
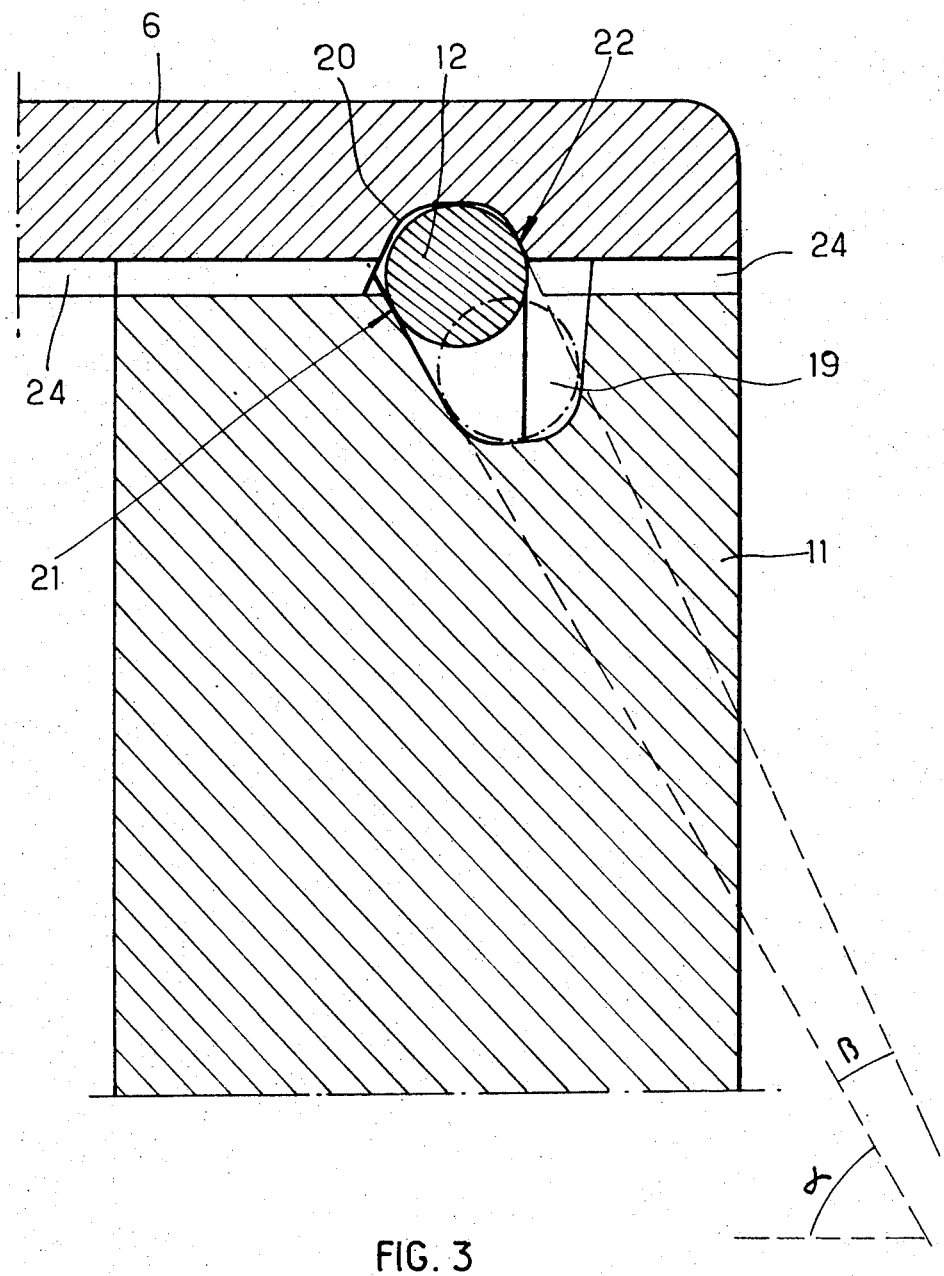
FIG. 3 is a detail view, in section and on a larger scale, of a modified form of the means of the invention.

The speed-change unit illustrated in FIG. 1 is of a known type and consists mainly of tapered discs 3 and rings 4 arranged alternately and forming a pack of variable thickness fitted between a driving shaft 1 and a driven shaft 2. The discs 3 are mounted on the driving shaft 1 to rotate therewith with the aid of grooves 5, whereas the rings 4 are mounted on and rotate with a drum 6 surrounding the driven shaft 2, with the aid of grooves 7. At its end adjacent to the driving shaft 1, the drum 6 is closed by a first plate 8 which, in accordance with the invention, is secured to the drum by means of a split keeper ring 9. Also, this cover plate is fixed to rotate with the drum by means of interior teeth 10 which co-operate with the grooves 7 in the drum.

Similarly, at the end near the driven shaft 2, the drum 6 is closed by a second plate 11, secured in a similar manner to the drum by means of a split keeper ring 12. Here again the cover plate is fixed to rotate with the drum by means of teeth 13 which co-operate with grooves 14 formed in the drum. This cover plate is also mounted to rotate with the driven shaft 2 by means of grooves 15, so that the driven shaft can be caused to rotate with the rings 4 by way of the drum.

In a conventional manner the stack of discs 3 and rings 4 is clamped by means of a portion 16 of the driven shaft 2, which portion is caused to bear in a resilient manner against said stack by a spring 17 backed by the cover plate 11 of the drum. Holes 18 for effecting dismantling are provided at certain points on the periphery of the drum 6 to enable the keeper rings 9 and 12 to be pushed inwardly from their respective locations so that the cover plates 8 and 11 can be released from the drum.

As can be seen more clearly from FIG. 2 which illustrates on a larger scale the upper left-hand corner of the speed-change unit, the keeper ring 9 is fitted in an annular channel 19 formed in the periphery of the cover plate 8 and bears resiliently in an annular channel 20 formed in the interior wall of the drum 6. In accordance with the invention, the channel 19 in the cover plate 8 has a first inclined surface 21 on its inner side, i.e., on the rear side of the channel 19 since the axial force provided by the spring 17 as applied to the cover plate is exerted leftwardly in FIG. 2, and this inclined surface 21 is inclined inwardly in the same axial direction as that in which the axial force is applied. Said surface 21 is inclined to the axis of the speed-change unit at an angle $\alpha$ which is advantageously between 45° and 80°. The channel 20 in the drum 6 on the other hand has a second inclined surface 22 on the opposite side that is the forward side relative to the direction of the axial force, which surface 22 is also inclined inwardly in the same axial direction as that in which the axial force is applied. It will be seen that the channel 20 also has an inclined surface on the other side, this arrangement being chosen merely to simplify manufacture.

Thus the keeper ring 9 bears on two inclined surfaces, and the directions of the forces applied to this keeper ring are exactly known. Furthermore, since the two inclined surfaces 21 and 22 converge towards the axis and form with each other an angle $\beta$, the resultant of these forces is always directed outwardly, and consequently tends to hold the keeper ring 9 against the floor of the channel 20 in the drum. Thus any possible displacement of the cover plate in relation to the drum is prevented.

A very slight axial gap 23 is of course necessary between the cover plate 8 and the drum 6, at the teeth 10, in order to permit the keeper ring 9 to enter the channel 20 in the drum when the speed-change unit is being assembled, this requirement being imposed because of the convergence of the two inclined surfaces 21 and 22. In this connection it will also be seen that the angle $\beta$ at which the two inclined surfaces converge towards each other has to be relatively small so that the radial effort applied by the keeper ring to the drum is not too great.

In the modified arrangement illustrated in FIG. 3, the cover plate 11 is mounted to rotate with the drum 6 by means of fine grooves 24 of any suitable shape and formed respectively in the inner wall of the drum and the periphery of the cover plate. It should be pointed out that such grooves are easier to form in the cover plate 11 than the teeth 13 shown in FIG. 1. The depth of these grooves must of course be less than the radial distance separating the lines of contact of the keeper ring 12 with the inclined surfaces 21 and 22 of the two channels 19 and 20, so that said lines of contact are effectively continued.

I claim:

1. In combination, a cylindrical part having a tubular portion, a circular disc-shaped part positioned within said tubular portion and being subjected to an axial force thereon in a selected axial direction, and securing means for fixedly but releasably connecting said circular part to said cylindrical part, and securing means including an annular groove formed in the periphery of said circular part and a resilient keeper ring adapted to be fully positioned within said groove, said securing means also including an annular channel formed in the interior wall of said tubular portion with said keeper ring being resiliently expandable to extend into said annular channel for fixedly connecting said cylindrical and circular parts, comprising the improvement wherein said annular groove has a first side surface on the rearward side thereof as viewed in said selected direction which is inclined at an angle of less than 90° relative to the axis of said cylindrical part and extends at a slope which projects radially inwardly toward said axis and axially in said selected direction, and said annular channel having a second side surface thereon which is on the front side thereof as viewed in said selected direction and which is inclined at an angle of less than 90° relative to said axis, said second surface also being sloped radially inwardly toward said axis and axially in said selected direction, said first and second surfaces engaging said keeper ring on substantially diametrically opposite sides thereof and converging toward one another as they project towards said axis, whereby said keeper ring is tightly held within said annular channel to prevent separation of said parts when an axial force is imposed on said circular part in said selected axial direction and one of said parts having access opening means formed therein and communicating with said annular channnel for permitting said keeper ring to be displaced into said groove after said parts are assembled.

2. The combination according to claim 1, wherein the first inclined surface forms an acute angle with said axis which is in the range of between 45° and 80°.

3. The combination according to claim 2, wherein the second inclined surface forms an acute angle relative to said axis which is only slightly larger than the acute angle formed by said first inclined surface.

4. The combination according to claim 1, wherein said cylindrical part and said disc-shaped part as fixed thereto are both mounted for rotation, the interior wall of said tubular portion and the periphery of said disc-shaped part having cooperating grooves formed thereon having a radial depth which is less than the radial distance separating the lines of contact between the keeper ring and the first and second inclined surfaces.

* * * * *